(12) United States Patent
Mercado et al.

(10) Patent No.: US 9,311,665 B2
(45) Date of Patent: Apr. 12, 2016

(54) METHODS AND APPARATUS FOR PRODUCT PRICE VERIFICATION AND INFORMATION DISPLAY

(75) Inventors: Brennan Eul I. Mercado, Cagayan de Oro (PH); Albertus Maria Geradus Claessen, Oakwood, GA (US)

(73) Assignee: NCR Corporation, Duluth, GA (US)

( * ) Notice: Subject to any disclaimer, the term of this patent is extended or adjusted under 35 U.S.C. 154(b) by 655 days.

(21) Appl. No.: 12/497,080

(22) Filed: Jul. 2, 2009

(65) Prior Publication Data

US 2011/0000963 A1   Jan. 6, 2011

(51) Int. Cl.
*G06Q 30/06* (2012.01)
*G06Q 10/10* (2012.01)

(52) U.S. Cl.
CPC .......... *G06Q 30/0603* (2013.01); *G06Q 10/10* (2013.01)

(58) Field of Classification Search
CPC . A61B 5/0095; G07C 9/00111; H04W 4/021; G08G 1/20; G08G 1/207; H04N 5/44543; H04N 21/4334; H04N 21/42204; H04N 21/4316; H04N 21/4345; G06Q 30/00; G06Q 10/10
USPC ........................................... 705/10; 340/10.6
See application file for complete search history.

(56) References Cited

U.S. PATENT DOCUMENTS

| | | | | |
|---|---|---|---|---|
| 2002/0145047 A1* | 10/2002 | Goodwin, III | ....... | G07G 1/0054 235/462.46 |
| 2003/0040922 A1* | 2/2003 | Bodin | ............. | G06Q 10/087 705/1.1 |
| 2003/0042313 A1* | 3/2003 | Kahn et al. | ............... | 235/462.46 |
| 2003/0107770 A1* | 6/2003 | Klatchko et al. | ............. | 358/3.21 |
| 2003/0177053 A1* | 9/2003 | Otto | ................. | 705/10 |
| 2005/0178832 A1* | 8/2005 | Higuchi | ........................ | 235/440 |
| 2005/0258961 A1* | 11/2005 | Kimball et al. | ........... | 340/572.1 |
| 2006/0065730 A1* | 3/2006 | Quan et al. | ..................... | 235/451 |
| 2006/0124722 A1* | 6/2006 | Williams et al. | ............... | 235/375 |
| 2007/0019110 A1* | 1/2007 | Cho | ............................. | 348/554 |
| 2007/0024551 A1* | 2/2007 | Gelbman | ........................ | 345/85 |
| 2008/0189142 A1* | 8/2008 | Brown et al. | ..................... | 705/4 |
| 2008/0189152 A1* | 8/2008 | Hara et al. | ......................... | 705/7 |
| 2008/0198016 A1* | 8/2008 | Lawrence et al. | ........... | 340/572.4 |
| 2008/0238009 A1* | 10/2008 | Carpenter | ............ | B62B 3/1408 280/33.992 |
| 2008/0261564 A1* | 10/2008 | Logan | ........................... | 455/413 |
| 2008/0315998 A1* | 12/2008 | Fioriglio | .............. | G06K 7/0004 340/10.3 |
| 2009/0029647 A1* | 1/2009 | Wei et al. | ...................... | 455/41.3 |
| 2009/0045261 A1* | 2/2009 | Pine | ................... | G06K 7/10732 235/462.42 |
| 2009/0063848 A1* | 3/2009 | Iwayama et al. | .............. | 713/150 |

(Continued)

FOREIGN PATENT DOCUMENTS

WO   WO 2007009999 A1 *  1/2007  ............. G06K 17/00

*Primary Examiner* — Sonji Johnson
(74) *Attorney, Agent, or Firm* — Paul W. Martin; Schwegman Lundberg & Woessner

(57) ABSTRACT

Systems and techniques for automated customer display of product information. A price verification and product information station broadcasts a radiofrequency identification (RFID) interrogation signal and receives an RFID return message from an RFID tag affixed to a product in the immediate vicinity of the station. The station relays the return message to a server, which generates information responsive to the return message, for example, by decoding the RFID return message to extract product information included in the RFID return message. The server organizes and formats the product information extracted from the return message, and the retrieved information, and transmits it to the station, which displays the information.

18 Claims, 4 Drawing Sheets

(56) References Cited

U.S. PATENT DOCUMENTS

| | | | |
|---|---|---|---|
| 2009/0219170 A1* | 9/2009 | Clark et al. | 340/825.49 |
| 2009/0225000 A1* | 9/2009 | Rosander et al. | 345/2.3 |
| 2009/0265280 A1* | 10/2009 | Taneja | G06Q 50/188 705/80 |
| 2009/0303018 A1* | 12/2009 | Catteau | 340/10.6 |
| 2010/0001863 A1* | 1/2010 | Salim et al. | 340/572.1 |
| 2010/0140351 A1* | 6/2010 | Trenciansky | 235/383 |
| 2010/0331741 A9* | 12/2010 | Cioanta et al. | 601/2 |
| 2011/0072132 A1* | 3/2011 | Shafer et al. | 709/224 |

\* cited by examiner

METHODS AND APPARATUS FOR PRODUCT PRICE VERIFICATION AND INFORMATION DISPLAY

FIELD OF THE INVENTION

The present invention relates generally to improved systems and techniques for automated product price verification and information display for retailer customers. More particularly, the invention relates to improved systems and techniques for reading product information stored in a radio frequency identification (RFID) device and presenting the information to a customer presenting the product at a display terminal.

BACKGROUND OF THE INVENTION

Typical prior art price verifiers include a bar code scanner to which a customer presents a product bearing a bar code. The bar code is scanned and decoded and the bar code information is relayed to an information repository such as a server storing a price lookup database. Information associated with the product bar code is retrieved and relayed to the price verifier for display.

A typical product bar code, such as a product bar code does not itself provide substantive information about a product. Instead, a product bar code serves as an index to a database such as the price lookup database, and the only information that can be provided by a price verifier is information that has been previously stored in the database in association with the bar code. Such information is typically relatively limited in scope. Particularly when used in connection with standardized products for which a universal product code is used, the information associated with the product bar code is information representative of the product category, rather than individual specimens of a product.

SUMMARY OF THE INVENTION

The present invention recognizes that continuing advances in technology have provided storage mechanisms that have become progressively smaller in size, less expensive, and having greater storage capacity. One increasingly widely used mechanism for information storage and retrieval is the use of a radio frequency identification (RFID) device, and the small size and low cost of such devices makes it well suited for use in product identification and information storage, allowing each product specimen to have affixed an RFID device storing information about the particular product specimen.

Many products include a bar code such as a universal product code (UPC) suitable for use in retrieving a stored record from a database or other storage medium. The stored record will typically include stored information relating to the product category, rather than the particular product specimen, and will be specific to the retailer selling the product. A retailer will typically maintain data correlated to product identifiers, such as price lookup table, a universal product code database, or both, and such data will include information such as name and other descriptive information associated with the product category, and the price charged by the retailer. An RFID tag affixed to a product may store a similar identifier, to allow for the use of an identifier for retrieval of data without the need to scan a bar code.

In addition or as an alternative to storing an identifier associated with a product category, an RFID tag may also store specific information related to specific product specimens. A manufacturer may store such information in an RFID tag and affix each tag to a product specimen before the product specimen is delivered to a retailer. Such information is not conducive to storage in a central database by a retailer, because the retailer would need to store information relating to every specimen of a product received, rather than simply storing product information applicable to all specimens of the same product The present invention utilizes such information by providing for a price verification and information display station including RFID capabilities. A station according to an aspect of the present invention responds to a customer presentation of a product by retrieving and displaying selected information relating to the product. The station may include a bar code scanner, and additionally or alternatively includes an RFID reader with an RFID antenna capable of communicating at short range with an RFID device, such as an RFID tag. The communication range is preferably no more than five inches. Upon approach by a customer, the station activates its bar code scanner and RFID reader, and the RFID reader broadcasts an interrogation signal. Upon presentation of a bar code affixed to a product, the scanner reads the bar code and extracts bar code data. In addition, the ID reader receives a return message from any RFID tag affixed to the product, including information stored in the tag. The station receives an RFID return signal from the tag, and relays bar code data and the return signal to a server providing information retrieval and processing resources to the station. The server decodes the return signal to extract product information appearing in the return signal, and also retrieves information associated with the bar code information. Additionally, if an identifier associated with stored information appears in the RFID return signal, the server retrieves such stored information. The server also organizes and formats information provided by the return signal, and any retrieved information for display and transmits this information to the station. The station then displays the information.

A more complete understanding of the present invention, as well as further features and advantages of the invention, will be apparent from the following Detailed Description and the accompanying drawings.

DETAILED DESCRIPTION

Figure 1:
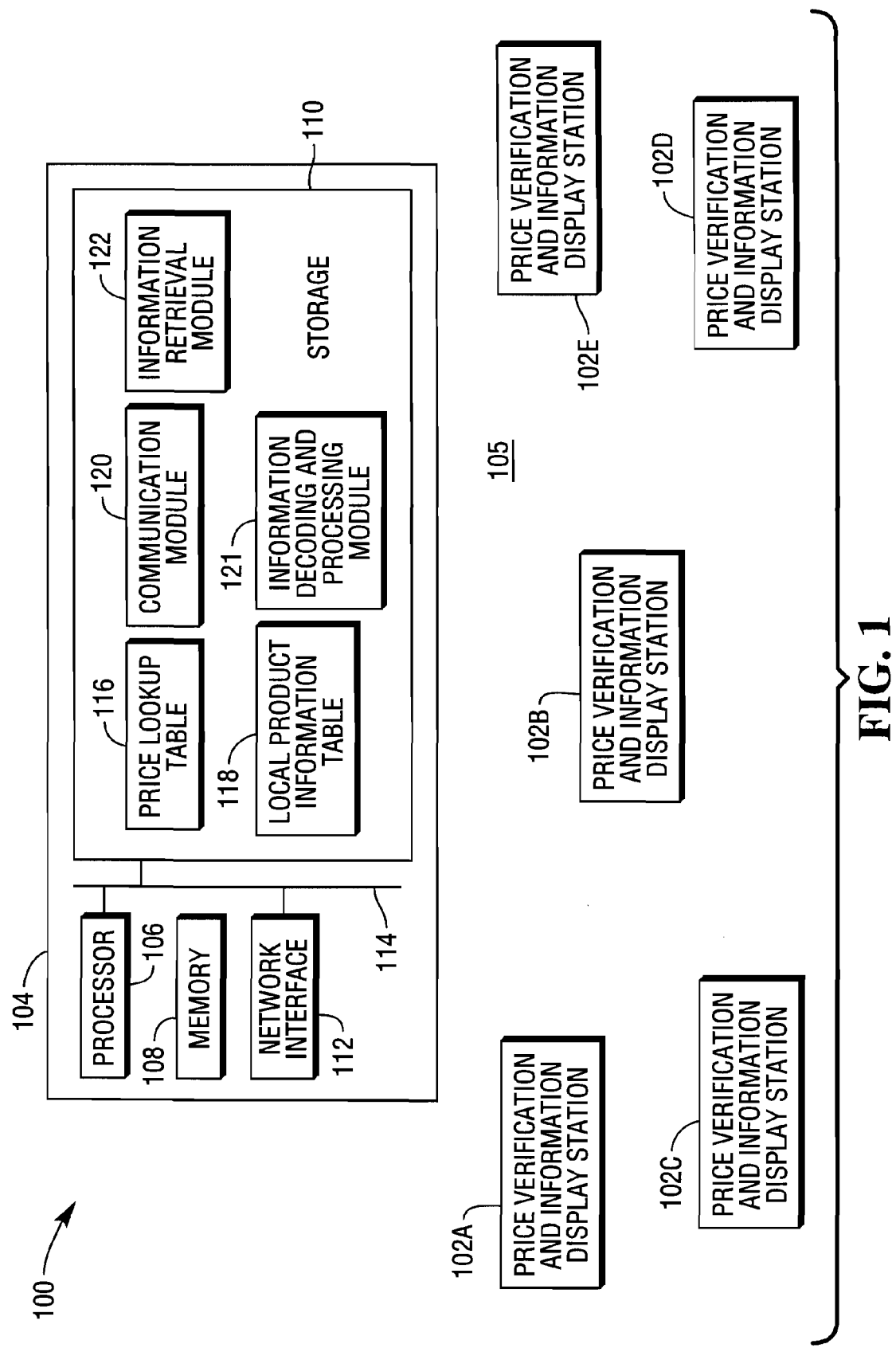
FIG. 1 illustrates a price verification and information display system according to an aspect of the present invention.

FIG. 1 illustrates an information retrieval and display system 100 according to an aspect of the present invention. The system 100 includes a plurality of information display stations 102A-102E, communicating with a server 104. The display stations 102A-102E are preferably deployed throughout a retail establishment 105, at locations conveniently accessible to customers. The stations 102A-102E are also designed so as to be operable with little or no intervention by customers other than by presenting a product about which information is desired.

As discussed in greater detail below, alternative configurations of a system such as the system 100 may be employed in which a server is not used. The configuration discussed herein describes various functions supported and carried out by the server 104, as well as additional functions that do not employ the server 104.

The server 104 employs a processor 106, memory 108, storage 110, and network interface 112, communicating over a bus 114. Depending on the desired design of the system 100, the network interface 112 may provide for direct wireless communication by the server 104, or may provide for a wired connection to a router that provides a combination of wireless and wired connections.

The display stations 102A-102E and the server 104 may suitably comprise a wireless network, in the form of a low power mesh network, in which each of the stations 102A-102E acts as a client and a repeater, and in which each station may act as a client of one or more other stations and also serve as a repeater to one or more other stations. In this way, communications may be relayed between each station and the server 104 without a need for stations more distant from the server to use the power needed to communicate directly with the server. Each of the stations communicates with an RFID device brought within its range, interrogating the device and receiving a response.

The server 104 provides data and processing resources to the stations 102A-102E, implemented in the form of various data repositories and software modules stored in long term storage 110. The server 104 may include a price lookup table 116, a communication module 120, an information decoding and processing module 121, and an information retrieval module 122. The various tables and modules are stored in the long term storage 110 and transferred to memory 108 as needed for execution or examination by the processor 106. As described in additional detail below, the price lookup table 116 stores price and other information associated with categories or models of products, such as information associated with a universal product code (UPC). The communication module 120 manages the receipt of and response to messages from stations such as the station 102A. The information decoding and processing module 121 processes messages received from stations such as the station 102A for use by the server 104 and in order to provide processing and data organization services to the stations 102A-102E. The information retrieval module retrieves stored information responsive to messages received from the stations, for example, retrieving price lookup data associated with a bar code.

Figure 2:
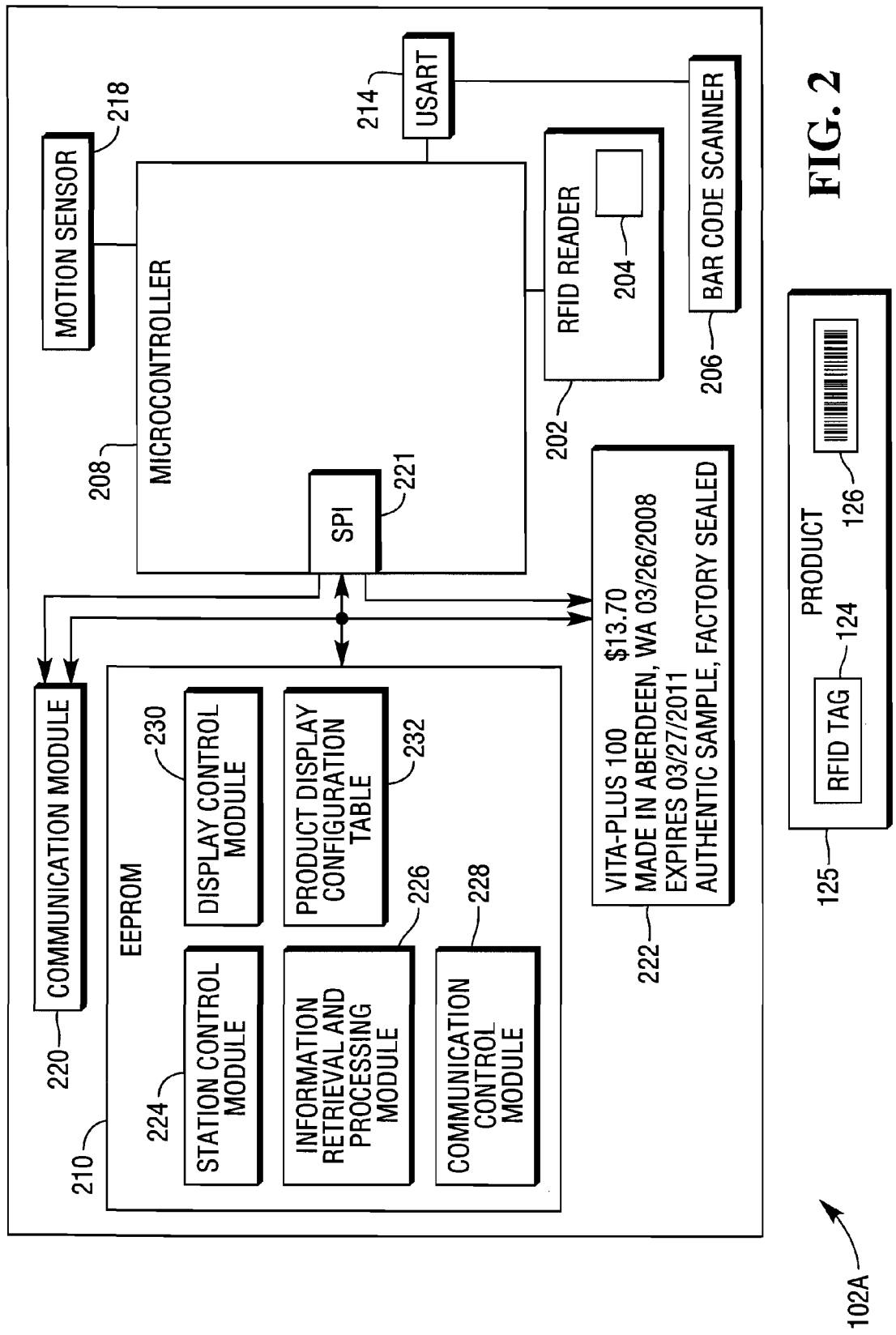
FIG. 2 illustrates a price verification and information display station according to an aspect of the present invention.

FIG. 2 illustrates additional details of the station 102A. To avoid duplication, the stations 102B-102E are not described in detail here, but may be understood to be similar in configuration to the station 102A.

The station 102A preferably communicates with an RFID device, such as the RFID tag 124 affixed to a product 125. The product 125 may also bear a bar code 126. Communication is carried out using an RFID reader 202. The ID reader 202 employs an RFID antenna 204, which is preferably configured so as to provide a short communication range, with a maximum on the order of 5 inches from the station 102A. The station 102A is designed to provide immediate information to a customer presenting a specific product bearing an RFID device, and the short range of the RFID reader prevents interrogation of RFID devices that are not being presented by a customer, such as devices affixed to items on shelves in the vicinity of the station 102A. The station 102A also includes a bar code scanner 206, and one advantageous design for the antenna 204 provides a range such that an RFID tag affixed to a product will be within range of the antenna 204 when a bar code affixed to the product is presented to the bar code scanner 206.

The operation of the station 102A is controlled by a processor, which may take the form of a microcontroller 208. One advantageous choice for the microcontroller 208 is a model MC9S08GB60CFUE from FREESCALE Semiconductor®, although any of numerous alternative microcontrollers or other processors may be used. The microcontroller 208 operates under the control of instructions suitably stored in a permanent or semipermanent memory, such as an EEPROM 210. The bar code scanner 206 suitably communicates with the microcontroller 208 through a universal asynchronous receiver/transmitter (USART) 214. The station 102A also includes a motion sensor 218 and a communication module 220, which may suitably be a radio frequency module suitably for use in a low power mesh network. One suitable choice for the radio frequency module is an MC13193FC 2.4 GHz ZIGBEE module available from DIGI International®, although any of numerous alternative radio frequency modules may be used. The microcontroller 208 suitably provides a serial peripheral interface (SPI) 221 for communication with the EEPROM 210, the communication module 220, and a display 222, and provides ports for communication with the RFID reader 202, motion sensor 218, and bar code scanner 206.

The instructions stored in the EEPROM 210 may suitably include a station control module 224, an information retrieval and processing module 226, a remote communication control module 228, and a display control module 230.

When the motion sensor 218 detects the approach of a customer, the station control module 224 controls the microcontroller 208 to activate the RFID reader 202 and the bar code scanner 206. Upon activation, the RFID reader 202 broadcasts an interrogation signal. An RFID device within range of the antenna 204, such as the RFID tag 124, will receive the interrogation signal and return a response, which is processed under control of the information retrieval and processing module 226. Upon scanning of the bar code 126, the bar code scanner 206 processes the bar code 126 and extracts bar code information, which is also furnished to the information retrieval and processing module 226.

The return message received from the RFID reader 202 is typically encoded, and decoding the information and formatting it for display requires a greater or lesser amount of processing. Depending on the desired processing capacity of the station 102A, a greater or lesser portion of the processing can be performed at the server 104, to relieve the burden on the station 102A and to allow for a simpler design for the station 102A. According to one embodiment, the information retrieval and processing module 226 does not provide for decoding of information returned from a tag such as the tag 124 at the station 102A. Instead, the information retrieval and processing module 226 directs the encoded information received from the RFID tag 124 to the communication control module 228, which invokes the communication module 220 to route the message to the server 104. The communication module 220 transmits the message to the nearest device acting as a communication server with respect to the station 102A. This device may be the server 104, or one of the other stations 102B-102E. If the message is initially relayed to another station, the message is further relayed from station to station until it reaches the server 104. The server 104 then processes the message.

Processing of the message suitably includes decoding the information received from the station 102A to generate representations of alphanumeric characters or other data normally used by the server 104. The information decoding and processing module 121 decodes the message relayed from the tag 124 to the station 102A and uses it as appropriate.

An RFID tag such as the tag 124 typically stores significant information relating to the particular product specimen to which it is affixed, and the use of such an RFID tag allows for the direct retrieval of such information upon presentation of the product specimen, without a need to consult centrally stored information. Such information can be coordinated with information retrieved using bar code data. Thus, the information decoding and processing module 121 may pass bar code information to the information retrieval module 122, and the information retrieval module 122 then retrieves information from the price lookup table 116 and passes this information to the information decoding and processing module 121. The information retrieval and processing module combines the retrieved information with information returned by the RFID tag and organizes and formats both the retrieved information and the RFID information for display.

The station 102A and the server 104 may also provide for assurance against accidental reading of tags other than the tag affixed to the product being presented. For example, the station control module 224 may activate the RFID reader 202 only after the bar code has been read, providing assurance that the product being presented is at distance sufficiently close to the station 102A. In addition, the server 104 may match bar code information and RFID information to insure that information from both sources is associated with the same product. For example, a product identifier for the product in question may be stored on the tag 124. This information may be furnished to the information decoding and processing module 121, which will fail to recognize the received information as valid unless matching product identifiers are read from the bar code 126 and from the tag 124.

In the present example, the RFID tag 124 is affixed to an over the counter vitamin supplement, and stores data programmed into the tag 124 by the manufacturer. This information includes date of manufacture, place of manufacture, expiration date, and a verification of authenticity. Upon interrogation, the RFID tag 124 generates a return message including this information.

The data is received in encoded form, and may be passed by the station 102A to the server 104. The station 102A also relays bar code data to the server 104. In the present example, the bar code is a universal product code for a package of 100 vitamin supplement pills, whose brand name is Vita-Plus. Product description and price information for the product are stored by the server 104 in the price lookup table 116.

Thus, the information retrieval module 122 retrieves the Vita-Plus description and price information and the information decoding and processing module 121 combines this information with the information retrieved from the tag 124. The information decoding and processing module 121 formats the information for display by the station 102A.

Formatting may include, for example, addition of formatting codes, such as codes indicating font sizes and styles, codes indicating attention catching features, such as blinking or sound, and designation of display registers in which information is to be stored by the station 102A. When the data is passed back to the station 102A, the station control module 224 invokes the display control module 230, which controls the microcontroller 208 so as to present the data in conformity with the formatting information.

As a further alternative, which achieves a still greater economy of processing load for the station 102A, the data retrieval and processing module 121 may, rather than transmitting data and formatting codes to the station 102A, process the data so as to create a display image, with the display image comprising, for example, a pixel map with data indicating the location and characteristics of each pixel making up a display. When the data comprising the pixel map is received at the station 102A, the display module 230 simply directs the microcontroller 208 to activate the pixels indicated in the pixel map.

It is also possible to adapt the station 102A, and the other stations, to retrieve and display information directly from RFID devices such as the tag 124, without a need for decoding at the server 104, and may in some cases display information without a need for communicating with the server 104.

In one embodiment, therefore, in addition to instructions for managing transfer of information to the server 104 for processing and receiving and displaying processed information, the EEPROM 210 may store instructions used by the microcontroller 208 for interpreting and displaying data retrieved from the tag 124 or similar tags. For example, the information retrieval and processing module 226 may interpret the message returned from the tag 124 or similar tags to determine what decoding and processing, if any, is to be retrieved from the server 104 and what decoding and processing is to be performed at the station. The information retrieval and processing module 226 may thus include instructions for decoding a return message from a tag and for positioning and formatting information for display. In some cases, particularly in cases in which a product is packaged by the retailer managing the system 100, a tag affixed to a product may include all relevant information, so that it is not necessary to read a bar code or to communicate with a server such as the server 104. The tag may store product description and price information, as well as other relevant information, such as packaging date and expiration date, and this information may all be read directly from the tag affixed to the product without a need to communicate with the server 104.

In order to manage the processing load on the station 102A, and to allow for proper display of information from a number of different products, the tag 124 and similar devices may store and supply information used by the information retrieval and processing module 226 to assist in the interpretation and display of information. The tag 124 may store one of a number of product category identifiers, with each product category being associated with a set of data to be displayed and a display configuration for presenting the data. For example, in the example of the vitamin supplement discussed above, the tag 124 stores information identifying place and date of manufacture, expiration date, and authenticity verification. In addition, the tag 124 may store a category identifier indicating that the product is a vitamin supplement. The category identifier is always in the same position in a return message provided by the tag 124 and similar devices. The information retrieval and processing module 226 uses this category identifier as an index to a product display configuration table 232 stored in the EEPROM 210. The product display configuration table 232 includes a record for each product category, with each record including the product category identifier and a set of instructions for displaying the information associated with the identifier. For example, the instructions may indicate whether or not additional information is to be retrieved from the server 104. Further instructions may designate display positions for each element of data in the response received from the RFID device, and may include formatting information for each element of data. The record associated with the vitamin supplement category includes rules for interpreting the data, and in the present example directs presentation of description and price information returned from the server 104, followed by information that has been retrieved from the tag 124, relating to the specific specimen to which the tag is affixed. This record does not include the actual data, only instructions and codes for displaying the data. The data elements for products in a particular category may be organized so that they are always organized in the same way, so that retrieval, display, and formatting instructions can be organized by product category rather than individual product, and display and formatting can be carried out by stations such as the station 102A.

Figure 3:
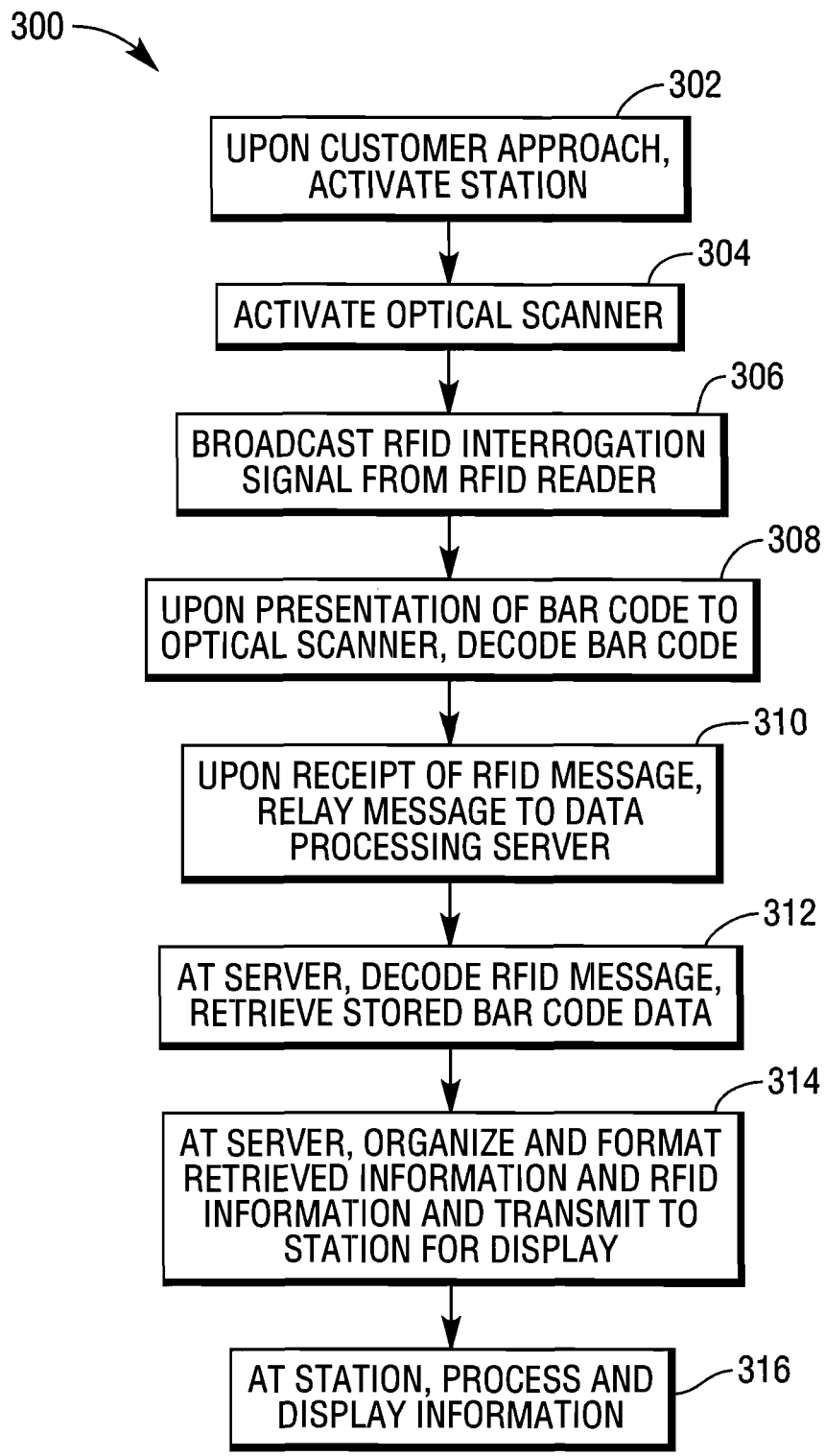
FIG. 3 illustrates a process of price verification and information display according to an aspect of the present invention.

FIG. 3 illustrates the steps of a process 300 according to an aspect of the present invention. The process 300 may suitably be implemented using systems and devices such as those described above and illustrated in FIGS. 1 and 2. At step 302, upon a customer's approach to a price verification and information display station, the station is activated, suitably by a motion detector. At step 304, an optical bar code scanner incorporated into the station is activated, and at step 306, an RFID reader incorporated into the station broadcasts an RFID interrogation signal detectable at a limited range around the station. At step 308, upon presentation of a bar code to the optical bar code scanner, the scanner decodes the bar code to generate bar code data. At step 310, upon receiving a return message from an RFID tag in response to the interrogation signal, the station transmits a message including the bar code information and the RFID return message to the data processing server, suitably through a low power mesh network comprising a plurality of additional stations serving both as communication servers to one another and as clients to one another. At step 312, the data processing server decodes the RFID return message and also retrieves stored data related to the bar code data. At step 314, the data processing server organizes and formats the information received from the RFID return message and retrieved information associated with the bar code data and transmits the information to the station for display. At step 316, the station processes and displays the information received by the data processing server.

Figure 4:
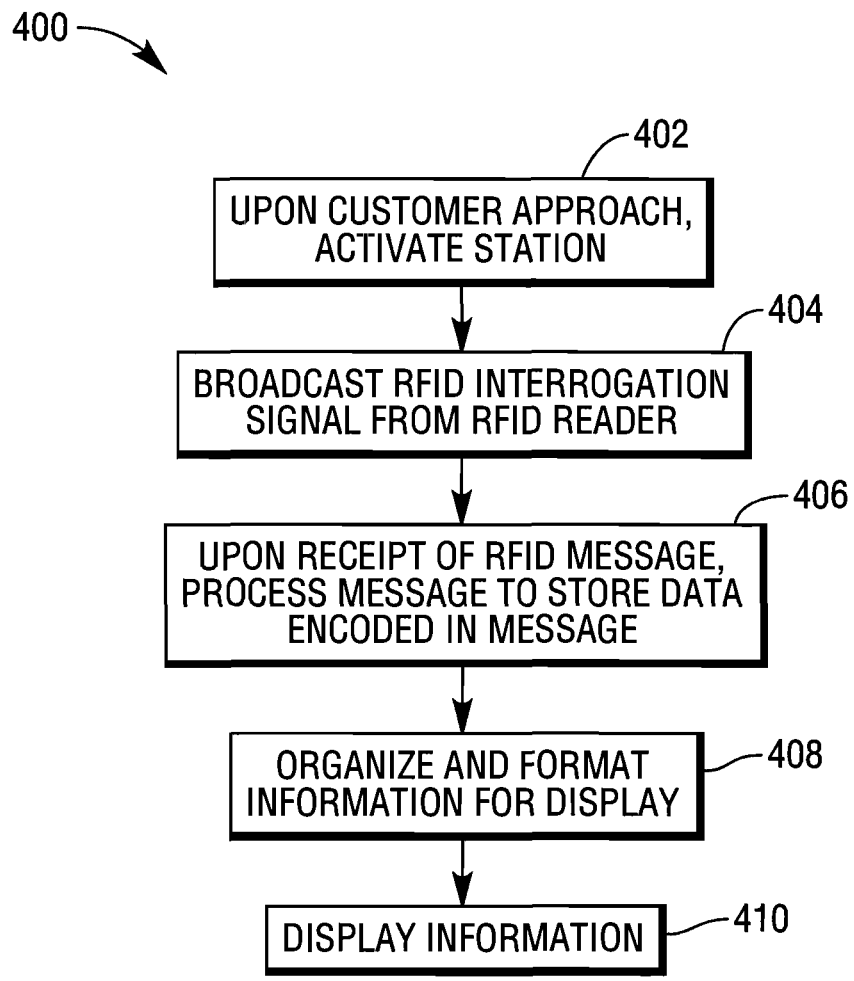
FIG. 4 illustrates an alternative process of price verification and information display according to an aspect of the present invention.

FIG. 4 illustrates an alternative process 400 of receiving and displaying product information. The process 400 may suitably be implemented using systems and devices such as those described above and illustrated in FIGS. 1 and 2. The process 400 does not involve the use of a remote data processing server. Instead, a station receives, processes and displays information stored on an RFID tag without recourse to external processing resources or data stores. At step 402, upon a customer's approach to a price verification and information display station, the station is activated, suitably by a motion detector. At step 404, an RFID reader incorporated into the station broadcasts an RFID interrogation signal detectable at a limited range around the station. At step 406, upon receipt of an RFID message from the RFID tag, the station processes the message to extract information encoded in the message. At step 408, the station organizes and formats the information for display, and at step 410, the station displays the information using a display device incorporated into the station.

While the present invention is disclosed in the context of a presently preferred embodiment, it will be recognized that a wide variety of implementations may be employed by persons of ordinary skill in the art consistent with the above discussion and the claims which follow below.

We claim:

1. A customer price verification and information display station comprising:

a radio frequency identification (RFID) reader for broadcasting an RFID interrogation signal to an RFID tag affixed to a particular product specimen presented at the station and receiving an encoded RFID return message from the RFID tag including information particular to the particular product specimen programmed into the RFID tag by a manufacturer of the particular product specimen;

a communication interface for communicating with a remote data processing server;

a processor for controlling the communication interface to relay the encoded RFID return message to the server and to receive a transmission from the server including decoded data representing the information particular to the particular product specimen, organized and formatted to include display formatting codes that the display station processes, the formatting codes generated by the server;

a display driven by the processor to process the formatting codes to display the decoded data received from the server including the information particular to the particular product specimen, and wherein the formatting codes include one or more font sizes, one or more font styles for displaying the decoded data on the display, codes indicating attention catching features when displaying, and designation of display registers in which the formatting codes are to be stored;

a barcode scanner for scanning a barcode affixed to the particular product specimen; and a motion sensor for detecting the presence of a customer approaching the station;

wherein when the motion sensor detects the presence of the customer, the processor is configured to activate the barcode scanner, and when the bar code scanner detects the barcode, the processor is configured to activate the RFID reader for broadcasting the interrogation signal.

2. The station of claim 1, further comprising the bar code scanner for reading the bar code affixed to the particular product specimen to extract bar code data identifying a product category to which the particular product specimen belongs, wherein the processor further controls the communication interface to relay the bar code data to the server, wherein the transmission received from the server further includes product description and price information for the product category centrally stored by the server and retrieved by the server in response to the bar code data, and wherein the display displays the retrieved data together with the decoded data.

3. The station of claim 2, wherein the processor activates the RFID reader after the bar code reader has read the bar code.

4. The station of claim 2, wherein the RFID return message includes a date of manufacture and an expiration date for the particular product specimen, as well as, a product category identifier for the particular product specimen and wherein the product category is included in the message relayed to the server for comparison against the bar code data.

5. The price verification and information display station of claim 1, wherein the transmission received from the server includes a display map defining placement and characteristic information for each pixel making up the display and wherein the processor directs presentation of a display conforming to the display map.

6. The station of claim 1, wherein the communication interface acts as part of a low power mesh network.

7. The station of claim 1, wherein the RFID reader has a receiving range of no more than five inches.

8. The station of claim 1 further comprising:
wherein information retrieved utilizing a bar code read by the bar code scanner and information retrieved from the RFID tag read utilizing the RFID reader are compared to confirm they match.

9. The station of claim 1 wherein said information particular to the product comprises date of manufacture, place of manufacture, expiration data, and a verification of authenticity.

10. The station of claim 1 wherein the RFID tag further stores at least one product category identifier associated with a set of data to be displayed and a display configuration for varying presentation of the set of data based on said at least one product category identifier.

11. A customer price verification and information display station comprising:
a radio frequency identification (RFID) reader for transmitting RFID interrogation signals to an RFID tag affixed to a particular product specimen presented by a customer at said station, and receiving an RFID return message from the RFID tag affixed to the particular product specimen presented by the customer;
a processor for processing the RFID return message to extract product description and price information for the product to which the RFID tag is affixed, the processor being further operative to extract non-price information relating to the particular product specimen presented including either a date of manufacture, an expiration date, or a verification of authenticity;
a display module directing the processor to activate pixels indicated in a pixel map, the pixel map generated by a server for the display station in response to the RFID return message sent to the server by the display station; and
a display for displaying the extracted information including either a date of manufacture, an expiration date, or a verification of authenticity, wherein the pixel map comprises data indicating a location and characteristics of pixels making up the display and the processor activates the pixels in the pixel map to control the display, and the server configured to provide visual features to associated extracted information with the pixel map and display registers in which to store the visual features;
a barcode scanner for scanning a barcode affixed to the particular product specimen; and
a motion sensor for detecting the presence of the customer approaching the station;
wherein when the motion sensor detects the presence of the customer, the processor is configured to activate the barcode scanner, and when the bar code scanner detects the barcode, the processor is configured to activate the RFID reader for broadcasting the signal.

12. The station of claim 11, wherein the RFID reader has a receiving range of no more than five inches to insure the RFID tag of the particular product specimen presented is the only RFID tag read.

13. The station of claim 11, wherein the RFID return message includes a general product category identifier for the particular product specimen being presented, and wherein the processor refers to stored general category information to organize and format the data for display according to the general category to which the particular product specimen belongs.

14. A method of customer price verification and product information display, comprising the steps of: controlling a radio frequency identification (RFID) reader to transmit an RFID interrogation signal to an RFID tag affixed to a particular product specimen presented for verification and receive an encoded RFID return message from an RFID tag storing information relating to the particular product specimen presented for verification, the encoded RFID return message including non-product category information relating to the particular product specimen presented for verification;
controlling a radio frequency communication module to relay the encoded RFID return message to a data processing server for decoding;
controlling the radio frequency communication module to receive a transmission from the server including decoded data from the encoded RFID return message organized and formatted to include formatting codes for controlling a price verification and product information display;
controlling a processor to drive the price verification and product information display to display the information provided by the transmission including said non-product category information in conformity with the formatting codes, wherein the formatting codes are generated by the server and processed to the display and include one or more font sizes, font styles for displaying the decoded data, codes indicating attention catching features when displaying, and designation of display registers in which the formatting codes are to be stored;
detecting, by a motion sensor, the presence of a customer approaching with the particular product specimen having a barcode affixed thereto; and activating, in response to detecting the presence of the custom by the processor, the bar code scanner;
detecting, by the barcode scanner, the presence of the barcode for the particular product specimen; and
activating, in response to the detection of the barcode by the processor, the RFID reader for transmitting the RFID interrogation signal.

15. The method of claim 14, further comprising a step of scanning the bar code affixed to the particular product specimen and relaying the bar code data to the server, and wherein the transmission received from the server includes combined product category information comprising product description and price information retrieved by the server in response to the bar code data.

16. The method of claim 15, wherein the step of scanning the bar code and relaying the bar code data to the server is followed by a step of controlling the server to compare product category information associated with the bar code against product category information indicated by the RFID return message to determine if the bar code data and the RFID data indicate the same product and transmitting an indication to present the product again if the bar code data and the RFID data do not indicate the same product.

17. The method of claim 15, wherein the RFID return message includes a product identifier and wherein the step of controlling the radio frequency communication module to relay the RFID return message to the server includes relaying the product identifier to the server for comparison with the bar code data.

18. The method of claim 14, wherein the transmission received from the server includes a display map defining placement and characteristic information for each pixel making up the display and wherein the processor directs presentation of a display conforming to the display map.

* * * * *